June 23, 1970  R. E. KEGAN  3,516,798
APPARATUS FOR HYDROGEN GENERATION
Filed Sept. 20, 1967
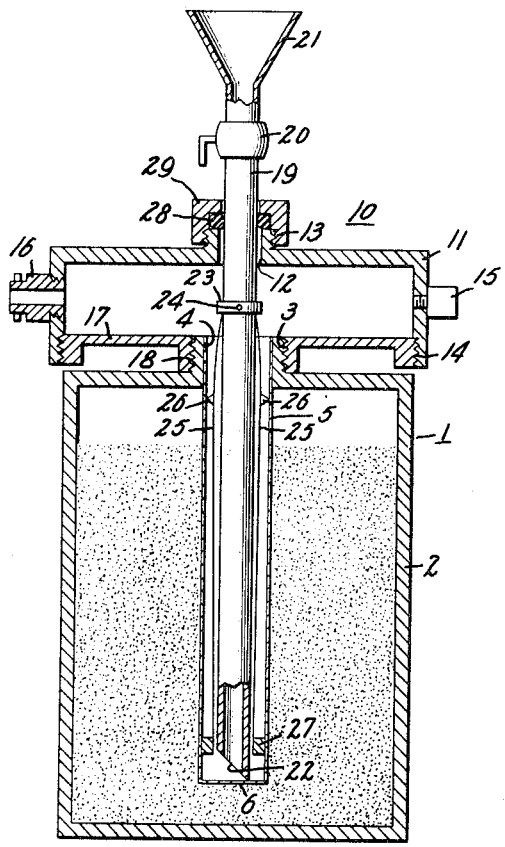
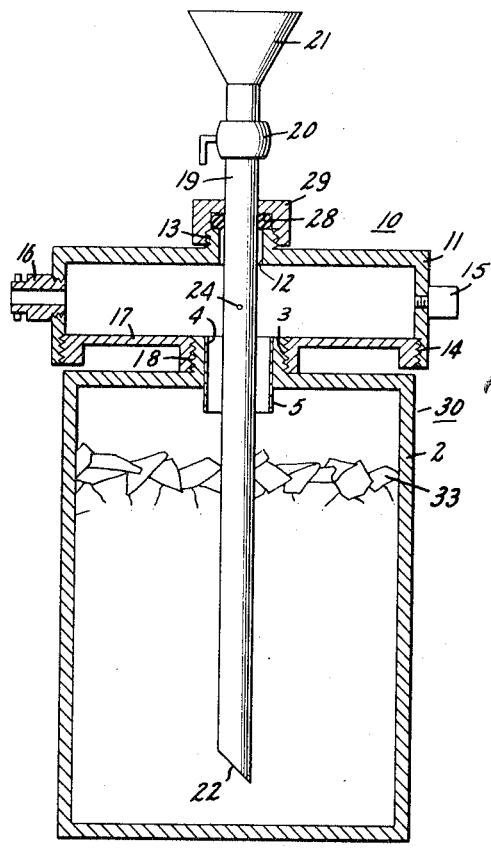
Inventor:
Robert E. Kegan,
by Carl O. Thomas
Attorney.

United States Patent Office 3,516,798
Patented June 23, 1970

3,516,798
APPARATUS FOR HYDROGEN GENERATION
Robert E. Kegan, Boxford, Mass., assignor to General Electric Company, a corporation of New York
Original application June 25, 1965, Ser. No. 467,025, now Patent No. 3,369,868, dated Feb. 20, 1968. Divided and this application Sept. 20, 1967, Ser. No. 669,245
Int. Cl. B01j 7/02
U.S. Cl. 23—282                                                           7 Claims

ABSTRACT OF THE DISCLOSURE

Apparatus for generating hydrogen by disarming a cartridge including a sealed container of phosphorus. The bursting tube of the cartridge is perforated and water introduced. Air and heat may be used to accelerate the reaction. When the phosphorus is completely consumed, the phosphoric acid which is formed as a reaction product may be reacted with metal scraps to produce additional hydrogen. Apparatus for the practice of the process utilizes an adaptor to sealingly connect a housing to the cartridge casing. A tube which may have a funnel at its upper end sealingly and slidably extends through the housing so as to be able to pierce the bursting tube. The housing is provided with an outlet for the delivery of hydrogen.

---

This patent application is a division of my co-pending, commonly assigned patent application Ser. No. 467,025, filed June 25, 1965, now Pat. No. 3,369,868, issued Feb. 20, 1968.

My invention relates to a process of using phosphorus stored within a sealed container to generate hydrogen and to an apparatus useful in such a process.

In certain field applications remote from electrical transmission lines, fuel batteries have proven to be superior sources of electricity. Fuel batteries deliver a greater energy output per pound than storage batteries and, even more importantly, do not become discharged in use, thereby requiring periodic replacement or recharge.

Fuel batteries operate by electrochemically combining a fuel and an oxidant. The oxidant may be oxygen from the atmosphere; hence, the sole logistic requirement of fuel batteries is fuel. Of the many possible types of fuel, hydrogen is generally preferred. Under ordinary circumstances, the hydrogen requirements of fuel batteries may be easily met, since hydrogen may be transported for use in bottled form or may be derived from hydrocarbons where and when required.

In view of the distinct advantages of fuel batteries and their simple fuel requirements, it has been proposed to outfit tactical military units with fuel batteries to meet their principal electrical requirements. While hydrogen supply constitutes no undue logistic burden, it is appreciated that tactical units in the exigencies of combat frequently become isolated from supply sources.

Accordingly, it is an object of my invention to provide a process and an apparatus for deriving hydrogen by reacting phosphorus with water.

It is a more specific object to provide a process and an apparatus for generating hydrogen by using phosphorus sealed within an ammunition casing.

It is a further object to provide a process and an apparatus for reacting phosphoric acid to produce hydrogen.

It is a still further object to provide a process and an apparatus for generating hydrogen by the contact of phosphoric acid and metals lying higher in the electromotive series than hydrogen.

These and other objects of my invention are accomplished by disarming a round of phosphorus containing ammunition. The sealed phosphorus containing chamber is perforated while water and heat are supplied to the chamber. Water reacts with the phosphorus to form phosphoric acid, and hydrogen is evolved and conducted from the chamber. The phosphoric acid may be used to generate additional quantities of hydrogen by contacting the acid with any available metal lying higher in the electromotive series than hydrogen.

For performance of my process, I provide an apparatus comprised of means forming a chamber including a first coupling means for coupling the chamber to a disarmed phosphorus cartridge and a second coupling means for coupling the chamber to a hydrogen transport conduit. A tube is sealingly and slidably mounted within the chamber. The tube includes means at its lower end for perforating the closed end of a bursting tube and means intermediate its ends for perforating the bursting tube at a point above its closed end.

My invention may be better understood by reference to the following drawings, in which—

FIG. 1 is an elevation, partly in section, of my inventive apparatus mounted on a disarmed phosphorus cartridge; and FIG. 2 is an elevation, partly in section, of my inventive apparatus mounted on a container filled with scrap metal.

FIG. 1 illustrates a disarmed phosphorus containing cartridge 1 comprised of an exterior casing 2 terminating at its upper end in a threaded connection 3. The casing is provided with an aperture 4 positioned centrally of the threaded connection. A thin-walled bursting tube 5 is mounted within the aperture 4 in sealed relation to the casing. The bursting tube is provided with a closed end 6. When armed, the cartridge is provided with an explosive, not shown, within the bursting tube and a fuse, also not shown, attached to the threaded connection.

A hydrogen generation adaptor 10 is shown attached to the disarmed cartridge 1. The adaptor is comprised of a housing 11 having an aperture 12 and threaded connection 13 at its upper end. The lower end of the housing is threaded at 14. A pressure responsive safety valve 15 is connected to the housing along with a quick release coupling 16.

A bushing 17 is threaded to the housing at 14. The bushing is provided with a threaded aperture 18 for attachment to the threaded connection 3 of the disarmed cartridge. Preferably, an adaptor is provided with a plurality of bushings 17 differing only in the size of the aperture 18 so that a single hydrogen generation adaptor may be used with a variety of differing size phosphorus cartridges. The bushing 17 and housing 11 together form an enclosed chamber.

The hydrogen generation adaptor includes a tube 19 having a valve 20 connected to its upper end and a funnel 21 connected to the valve. The lower end of the tube is provided with a sharp tapered edge 22 for piercing of the bursting tube. A collar 23 is fixed to the tube by a connector 24. Flexible arms 25 formed of a material such as spring steel depend from the collar. Each of the arms include a knife 26 extending radially outwardly. The lower end of each of the arms is connected to an abutment ring 27. The tube is sealed to the housing by an O-ring seal 28 compressed inwardly by a clamping collar 29 connected to the threaded connection 13.

In order to practice my process, a sealed container of white phosphorus is required. In a combat situation, such a sealed container may be obtained by disarming a phosphorus cartridge. A cartridge may be easily disarmed by removing the fuse threadedly attached to the casing and by next removing the high explosive contained in the bursting tube.

Having obtained a sealed container of phosphorus, the generation of hydrogen is accomplished by introducing heat, water, and optionally, air into the container. In the absence of a catalyst, a temperature of 280° C. or higher is required to generate hydrogen by the reaction of phosphorus and water. The reaction proceeds step-wise according to the following equations:

$$P_4 + 6H_2O \rightarrow 2HPO(OH)_2 + PH_3 \qquad (A)$$
$$HPO(OH)_2 + H_2O \rightarrow OP(OH)_3 + H_2 \qquad (B)$$
$$PH_3 + 4H_2O \rightarrow OP(OH)_3 + H_2 \qquad (C)$$

The over-all reaction may be written:

$$P_4 + 16H_2O \rightarrow 4H_3PO_4 + 10H_2 \qquad (D)$$

The heat required to initiate the reaction may be supplied by applying a flame or other heat source to the exterior of the phosphorus container. Heat may also be introduced by admitting the water in the form of steam. It is not necessary, however, that the high reaction initiating temperature be maintained throughout hydrogen generation. Phosphoric acid once formed serves as a reaction catalyst accelerating the rate of reaction and allowing temperature reduction. If available, phosphoric acid may be mixed with the water initially introduced to catalyze the reaction. Another simple way of catalyzing the reaction consists of admitting oxygen or air with the water. Air reacts spontaneously with white phosphorus at ambient temperatures according to the following equation:

$$P_4 + 5O_2 \rightarrow P_4O_{10} \qquad (E)$$

The phosphorus pentoxide, of course, reacts spontaneously with water to form phosphoric acid as indicated by the following equation:

$$P_4O_{10} + 6H_2O \rightarrow 4H_3PO_4 \qquad (F)$$

The hydrogen gas formed is conducted away from the phosphorus container to a suitable hydrogen storage unit for subsequent use. When the phosphorus is completely depleted from the container, phosphoric acid remains. Phosphoric acid may be readily reacted with any metal lying higher in the electromotive series than hydrogen to liberate gaseous hydrogen. Suitable metals include zinc, cadmium, iron, cobalt, nickel, lead, tin, and alloys thereof. Hydrogen may be conveniently generated by filling a large casing from a dismantled cartridge with small expendable metal elements.

My process may be more specifically understood by reference to the preferred embodiment of my apparatus. Noting FIG. 1, my hydrogen generation adaptor 10 is equipped with a proper size bushing 17 for coupling with the threaded connection 3 of the disarmed phosphorus cartridge 1. If it is desired to generate hydrogen gas by the use of water and heat supplied by a flame applied to the bottom of the container, the funnel 21 is first filled with water. The valve 20 is opened to allow the bursting tube 5 to fill with water also. If desired, sufficient water may be admitted to enter the chamber within the adaptor housing. According to an alternate technique the funnel may be omitted and a steam hose connected to the valve 20. Using still another technique water may be supplied intermittently to the funnel 21 so that air is trapped in the tube 19 and carried into the bursting tube.

In order to introduce water or a water-air mixture into the phosphorus container, the tube 19 is pressed downwardly so that the sharp edge 22 perforates the closed end 6 of the bursting tube. Next the tube is rotated back and forth so that the knives 26 cut windows in the bursting tube. This allows hydrogen generated by contact of water and phosphorus to exit through the windows and bursting tube into the housing chamber.

The hydrogen gas formed is exhausted from the adaptor through a hose or other conduit attached to the release coupling 16. If hydrogen pressure builds up more rapidly than it can be exhausted through the release coupling, the pressure responsive safety valve 15 will vent the excess hydrogen. The rate of hydrogen gas generation can be satisfactorily controlled by manipulation of the temperature of the cartridge casing.

When all the phosphorus within the cartridge casing has reacted, a reservoir of phosphoric acid remains. The hydrogen generation adaptor is then removed from the cartridge casing and attached to a similar cartridge casing 30 shown in FIG. 2. For convenience in handling, collar 23, arms 25, and abuttment ring 27 are shown removed from the adaptor. This may be easily accomplished merely by loosening connector 24. The cartridge casing 30 differs from cartridge casing 1 principally in having the bursting tube 5 at least partially removed. The cartridge casing 30 is filled with expendable items 33 formed of metals lying higher in the electromotive series than hydrogen.

The tapered edge 22 allows the tube 19 to be pushed downwardly into the small arms casings. The bushing is then attached to the threaded fuse coupling at the upper end of the disarmed cartridge. Phosphoric acid may then be introduced through the funnel 21 and tube 19 into the casing 30 from the casing 1. Hydrogen will again be generated and passed out through the quick release coupling 16 of the adaptor.

While my invention is described and illustrated with respect to disarmed phosphorus cartridges, it is appreciated that my process may be adapted for use with any sealed white phosphorus container. Additionally, the apparatus may take other forms than the specific form shown. For example, any conventional means may be used for perforating the thin-walled bursting tubes. My invention could also be practiced with phosphorus containers having frangible disks or plates in the container wall rather than bursting tubes. The safety valve is not required. Neither is the use of a separate removable bushing necessary.

While my invention is described with respect to the advantages of hydrogen generation, it is appreciated that the phosphoric acid generated by reacting white phosphorus with water or steam may itself prove a valuable end product. For example, numerous fuel cells utilize phosphoric acid as an electrolyte, and phosphoric acid generated by my process may be used to provide electrolyte for fuel cells initially transported without electrolyte to save weight or to supplement fuel cell electrolyte lost through leakage. It is appreciated that when phosphoric acid is the sole product of interest, it is unnecessary to make any provision for hydrogen collection except as may be necessary to avoid an explosion hazard such as that presented by an open flame.

These and other similar variations will be readily suggested to those having ordinary skill in the art. It is accordingly intended that the scope of my invention be determined by reference to the following claims.

What I claim as new and desire to secure by Letters Patent of the United States is:

1. A hydrogen generator comprising:
a reactant container,
means forming a chamber in said reactant container,
means coupling said chamber means to a hydrogen transport conduit, and
tubular means sealingly and slideably related to said chamber means including means for perforating said reactant chamber at a plurality of points along its axis to permit flow of liquid through said tube into said reactant container at one point of perforation and to permit flow of hydrogen from the reactant container through the chamber at another point of perforation to the hydrogen transport conduit.

2. A hydrogen generation adaptor according to claim 1 including means connecting said tubular means to a water supply source.

3. A hydrogen generation adaptor according to claim 2 in which said perforating means includes a tube having a sharp sloping edge.

4. A hydrogen generation adaptor according to claim 2 in which said perforating means includes a plurality of knives and spring means biasing said knives radially outwardly.

5. A hydrogen generation adaptor for attachment to a disarmed phosphorus cartridge including a casing and a bursting tube comprising chamber forming means coupled to said casing adjacent said bursting tube, said chamber means including a hydrogen delivery outlet, and tubular means sealingly and slidably related to said chamber means extending into said bursting tube, said tubular means having a diagonally sloping sharp-edged end portion, and means surrounding said tubular means and attached thereto including a plurality of knives and means outwardly biasing and supporting said knives.

6. A hydrogen generation adaptor comprising a housing having first and second apertures therein, a bushing removably secured to said housing and cooperating therewith to form a chamber, said bushing having a central aperture in axial alignment with said first aperture, a tube extending through said first aperture and said central aperture, a seal mounted in said first aperture cooperating with said housing and said tube, a first perforator positioned at the lower end of said tube, and a second perforator positioned on said tube in spaced relation to said first perforator.

7. A hydrogen generation adaptor comprising a housing having first and second apertures therein, a bushing removably secured to said housing and cooperating therewith to form a chamber, said bushing having a central aperture in axial alignment with said first aperture, a tube extending through said first aperture and said central aperture, a seal mounted in said first aperture cooperating with said housing and said tube, upper and lower collars mounted on said tube, said upper collar being attached to said tube, a plurality of resilient strips connecting said collars, and a plurality of knives mounted on said strips.

References Cited

UNITED STATES PATENTS

| 1,419,653 | 6/1922 | Van Meter | 23—282 |
| 2,594,879 | 4/1952 | Davis | 136—114 |

FOREIGN PATENTS

| 199,972 | 7/1908 | Germany. |

MORRIS O. WOLK, Primary Examiner

D. G. MILLMAN, Assistant Examiner

U.S. Cl. X.R.

23—211